(No Model.)

D. C. PEAT.
DITCHING TOOL.

No. 528,607. Patented Nov. 6, 1894.

Witnesses:

Inventor
David C. Peat
by
Butterworth & Dowell
his Attorneys

UNITED STATES PATENT OFFICE.

DAVID C. PEAT, OF SADORUS, ILLINOIS, ASSIGNOR OF ONE-HALF TO WILLIAM CRAW, OF SAME PLACE.

DITCHING-TOOL.

SPECIFICATION forming part of Letters Patent No. 528,607, dated November 6, 1894.

Application filed June 20, 1894. Serial No. 515,146. (No model.)

*To all whom it may concern:*

Be it known that I, DAVID C. PEAT, a citizen of the United States, residing at Sadorus, in the county of Champaign and State of Illinois, have invented certain new and useful Improvements in Ditching-Tools; and I do hereby declare the following to be a full, clear, and exact description of the invention, such as will enable others skilled in the art to which it appertains to make and use the same.

My invention relates to improvements in ditching tools, but more particularly to tools for making ditches for tiles. Heretofore in the construction of devices of this character it has been customary to form and secure the handle to the scoop in such manner that in making a ditch the scoop would spring or jump resulting in cutting a very irregular surface. Another disadvantage arose from the fact that either a solid back was provided for the scoop requiring it to be used in one way only; or that there was no provision whatever for preventing the material from passing through the scoop, in which case were the soil sandy it would be very difficult to provide a satisfactory ditch, as the material would not be retained within the scoop.

The primary object of my invention is to overcome these objectionable features by providing a simple, effective and inexpensive device, which will combine lightness with the necessary strength required.

Further objects of the invention are to provide a rigid connection between the handle and the scoop; to provide means whereby the scoop may be used as a shovel; and to provide means for retaining the material within the scoop.

With these several objects in view, the invention consists in the construction and combination of the several parts, as will be hereinafter fully described and then defined in the claims at the end of the description.

Figure 1:
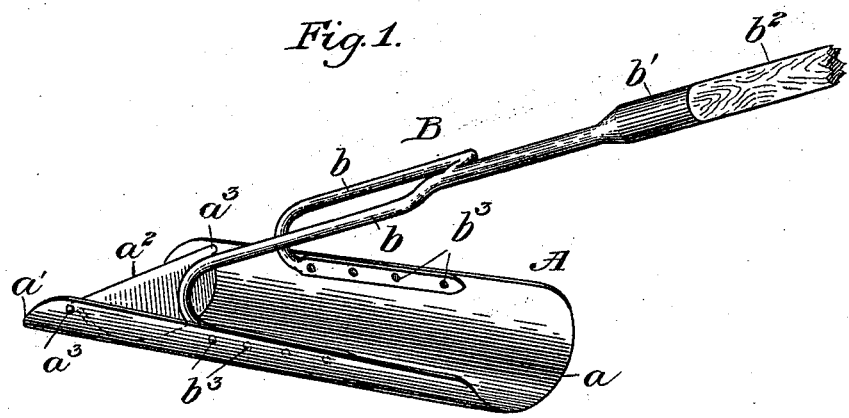
Figure 2:
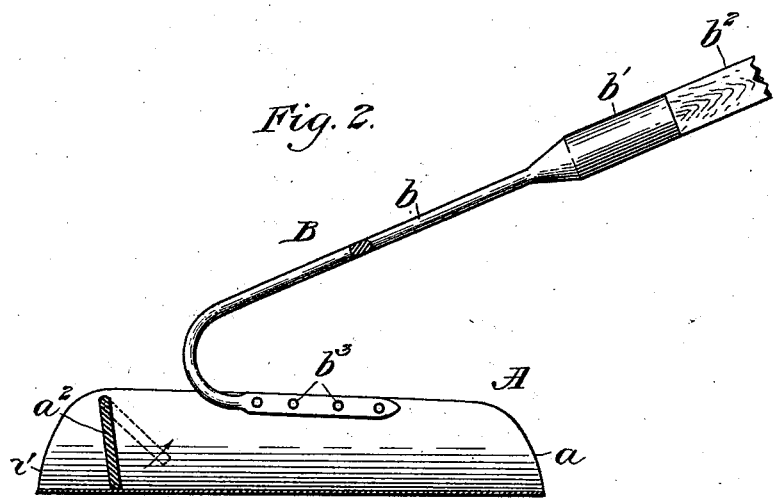
Figure 3:
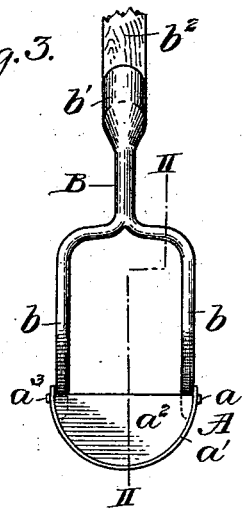

Referring to the accompanying drawings forming a part of this specification, Figure 1 is a perspective view of my invention. Fig. 2 is a vertical longitudinal sectional view on the line II—II of Fig. 3; and Fig. 3 is an end view of Fig. 2 looking in the direction of arrow III.

In the drawings the scoop A is preferably made of sheet metal having a curved or semi-cylindrical form. The scoop may be of any desired length and is preferably provided with cutting edges $a$, $a'$ at the opposite ends thereof to aid in forming the ditch. Within the scoop is arranged a gate $a^2$ pivotally secured thereto and preferably arranged between the two cutting edges of said scoop. This gate has pins or projections $a^3$ arranged on opposite sides thereof adapted to fit in apertures in the sides of the scoop; the said gate having its pivotal point in such position as to slightly incline the same to cause the lower edge to bind against the surface of the scoop to form a rigid backing for the material when in use. The gate may be thrown in the direction of the arrow to a position opposite to that shown in Fig. 2, or it may be removed entirely by slightly expanding the scoop when it is desired to use the scoop in material that is not loose, though this is not necessary to the successful working of the device.

To prevent the scoop from jumping or cutting an irregular surface I provide a handle B comprising a bifurcated end having the arms $b$ and a socketed end $b'$ in which is adapted to fit a handle rod or bar $b^2$. The arms $b$ extend to the opposite sides of the scoop and are slightly curved inwardly and have their ends arranged in the plane of the scoop to which they are secured by a series of bolts or rivets $b^3$. This construction forms a rigid connection to the scoop approximately in the line of draft of the scoop when in use, thereby materially aiding in retaining it to the work.

It is obvious that the form of the scoop may be changed and the other parts altered to correspond, if so desired, and that I might make other changes without departing from the spirit of my invention.

Having thus fully described my invention, what I claim as new, and desire to secure by Letters Patent of the United States, is—

1. A ditching tool, comprising a scoop, a gate pivotally arranged therein, and a handle secured to said scoop, substantially as described.

2. In a ditching tool, the combination with a curved scoop having a cutting edge at its opposite ends, of a gate pivotally connected to the sides of the scoop and arranged between said cutting edges, together with a handle secured to the sides of the scoop, substantially as described.

3. A ditching tool comprising a scoop having upwardly turned sides, and a handle provided with a bifurcated end the arms of which are curved and extend inwardly in the plane of the scoop toward the handle and rigidly secured near the upper edges of the opposite sides of said scoop by a series of rivets or bolts, substantially as described.

In testimony whereof I affix my signature in presence of two witnesses.

DAVID C. PEAT.

Witnesses:
W. A. LEWIS,
FRANK RICHARDSON.